(12) United States Patent
Krumm et al.

(10) Patent No.: US 7,509,131 B2
(45) Date of Patent: Mar. 24, 2009

(54) PROXIMITY DETECTION USING WIRELESS SIGNAL STRENGTHS

(75) Inventors: John C. Krumm, Redmond, WA (US); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/880,051

(22) Filed: Jun. 29, 2004

(65) Prior Publication Data

US 2006/0046709 A1 Mar. 2, 2006

(51) Int. Cl.
*H04W 24/00* (2006.01)

(52) U.S. Cl. .................. 455/456.1; 455/456.2; 455/517; 455/518; 455/520

(58) Field of Classification Search .......... 455/456.1–6, 455/517–520; 342/451
See application file for complete search history.

(56) References Cited

U.S. PATENT DOCUMENTS

| | | | |
|---|---|---|---|
| 5,430,761 | A | 7/1995 | Bruckert et al. |
| 5,950,133 | A * | 9/1999 | Bledsoe .................... 455/439 |
| 6,978,023 | B2 | 12/2005 | Dacosta |
| 7,129,891 | B2 * | 10/2006 | Meunier .................... 342/463 |
| 2002/0095486 | A1 | 7/2002 | Bahl |
| 2003/0220116 | A1 | 11/2003 | Sagefalk |
| 2003/0229445 | A1 * | 12/2003 | Tingley ..................... 701/207 |
| 2003/0232598 | A1 * | 12/2003 | Aljadeff et al. ............ 455/41.2 |
| 2004/0064693 | A1 * | 4/2004 | Pabla et al. ................. 713/168 |
| 2004/0072577 | A1 * | 4/2004 | Myllymaki et al. ....... 455/456.1 |
| 2004/0263388 | A1 * | 12/2004 | Krumm et al. ............. 342/451 |
| 2005/0075116 | A1 * | 4/2005 | Laird et al. ............... 455/456.3 |
| 2005/0124355 | A1 * | 6/2005 | Cromer et al. ............ 455/456.5 |
| 2005/0185615 | A1 * | 8/2005 | Zegelin ..................... 370/331 |
| 2005/0233748 | A1 * | 10/2005 | Robinson et al. ........... 455/440 |

FOREIGN PATENT DOCUMENTS

| | | |
|---|---|---|
| GB | 2329801 | 3/1999 |
| WO | WO01/28272 | 4/2001 |

OTHER PUBLICATIONS

European Search Report which corresponds to US patent application.

(Continued)

*Primary Examiner*—Yuwen Pan
(74) *Attorney, Agent, or Firm*—Workman Nydegger

(57) ABSTRACT

Described is a system and method in a wireless (Wi-Fi) network comprising a server, clients and various mechanisms that compute lists of other clients and resources that are physically nearby. Clients report Wi-Fi access points' signal strengths to a server, which uses that data to compute the proximity of resources to one another, including an estimate the distance between resources. The data may be returned to the client as a list of resources within short range proximity, or resources within long-range proximity, with an approximate time to that resource based on previous clients' reporting. Because proximity is used rather than absolute location, only minimal setup is needed. As the number of clients and resources that use the system increases, the server knowledge also increases with respect to the number of resources that can be found and in the physical range over which other people and places can be found.

25 Claims, 10 Drawing Sheets

OTHER PUBLICATIONS

Krumm J. et al. "RightSPOT: A Novel Sense of Location for a Smart Personal Object" Lecture Notes in Computer Science Springer Verlag, New York, NY, US vol. 2864, Oct. 12, 2003, pp. 36-43, XP002304129 ISSN: 0302-9743 * p. 38, line 22-p. 40, line 6*.

Office Action mailed Feb. 12, 2007 cited in related U.S. Appl. No. 10/677,125.

Office Action mailed Jul. 18, 2007 cited in related U.S. Appl. No. 10/677,125.

Office Action mailed Nov. 16, 2007 in related U.S. Appl. No. 10/677,125.

Office Action mailed Jul. 31, 2008 in related U.S. Appl. No. 10/677,125.

* cited by examiner

*FIG. 4*

| Logged in as George Washington |
|---|

Register | Report | Near Me

Type

- person
- conference room
- printer
- elevator
- stairs
- cafeteria
- kitchen
- mail room
- reception desk
- bathroom
- stitchable
- demo person Common Access Point

- Thomas Jefferson...
- George Washington...

Separated by Access Point Hops

- Abraham Lincoln (1) (<1 min)...
- Theodore Roosevelt (3) (<7 min)...

Look Back
Min.  Sec.
35     0

[Update]

FIG. 6

Logged in as George Washington

Register | Report  Near Me

Common Access Point (none sharing access point)

Separated by Access Point Hops

113 Reception (1) (<1 min) ...
112 Reception (2) (<7 min) ...
114 Reception (2) (<36 min) ...
115 Reception (2) (<33 min) ...

Type person
conference room
printer
elevator
stairs
cafeteria
kitchen
mail room
reception desk
bathroom
stitchable
demo person Look Back
Min.   Sec.
35     0

Update

PROXIMITY DETECTION USING WIRELESS SIGNAL STRENGTHS

FIELD OF THE INVENTION

The invention relates generally to computer systems and networks, and more particularly to computer systems employing wireless communications.

BACKGROUND OF THE INVENTION

One of the goals of ubiquitous computing is to build applications that are sensitive to the computer user's context. One important aspect of context includes the people and places that are close to the user. For example, at conferences, meetings and other social engagements, people interact with one another fairly regularly, and often see the same people at many such events. Various mechanisms have been tried to help people remember and/or discover the identities of others.

These mechanisms are based on location sensing and/or proximity sensing. Location sensing determines the absolute position (e.g., x,y coordinates) of a person, whereas proximity sensing discovers other people around a given user. Note that one common way to determine proximity is to measure absolute locations of multiple people and other sensors, and use the absolute location data to compute distances, providing inferences about proximity; in other words, traditional location sensing systems require computing and comparing absolute locations, which can be then used to compute proximity by measuring everyone's (x,y) locations and simply computing the distance between them.

Various ways to automatically measure location include using Wi-Fi signal strengths, GPS, and active badges, often requiring the deployment of specialized hardware in the environment, e.g. satellites for GPS and special receivers and/or transmitters for active badges. However, measuring (x,y) locations is difficult, because it requires extensive setup and calibration; the problem is especially difficult indoors where many people spend most of their time, and where GPS does not work.

Examples of identity-discovery mechanisms based on location and/or proximity sensing include wireless "conference devices" that are aimed at assisting conference attendees with such information, generally comprising small wireless devices that can be easily carried or worn, normally by people in large groups, such as nTAG™, SpotMe, IntelliBadge™, and other wearable or digital assistant devices. Among the features of these devices are their awareness of location and/ or who is nearby.

Other systems include Proxy Lady, a system for encouraging informal, spontaneous face-to-face meetings based on proximity, which is detected via personal digital assistants (PDAs) equipped with custom radio transceivers. Another system known as Trepia lets users communicate with other nearby users that it finds automatically; users can manually specify their location, and Trepia also uses wired and Wi-Fi network commonality to infer proximity. Another system known as iChat AV lets users on the same local network find each other for instant messaging or video conferencing. Similar systems for computer games let users on the same network find other nearby gamers. However, drawbacks to these mechanisms include that users have to be on the same network in order to find each other, and that only other people can be found, as opposed to other things.

In addition to discovering other people, many individuals would benefit from being able to discover other resources that are nearby. For example, a user of a mobile computing device may need to print a document, such as when out of the office, and would thus benefit from being able to detect the nearest available printer. There are well-established protocols for peer-to-peer device discovery using Bluetooth and Infrared Data Association (IrDA), however the discovery range of Bluetooth is limited to about 10 meters, and IrDA requires a clear line of sight between devices, and only works over a range of about one meter. Further, these mechanisms only find other properly-enabled computing devices, not other resources such as the nearest elevator, bathroom, or vending machine.

U.S. patent application Ser. No. 10/677,125, assigned to the assignee of the present invention and herein incorporated by reference, provides a mechanism whereby people can automatically discover who else is nearby, and also determine what other resources were near that person. To that end, wireless signal strengths (with respect to various base stations, or access points or the like) are gathered from participating resources such as network devices or previously calibrated locations, and then processed (e.g., by a server) to determine which devices are experiencing similar signal strengths. Those with similar signal strengths are determined to be in proximity to one another. With this information, information about another resource may be looked up or otherwise provided to a network device for presentation to a user of that device. While proximity-related mechanisms based on this technology work very well, improvements to this concept would be beneficial and advantageous.

SUMMARY OF THE INVENTION

Briefly, the present invention provides a system and method in a wireless network for discovering the distance between a client and a resource, based on short range or long-range proximity computations. In one implementation, each wireless signal strength reading of any accessible access point is obtained by a client device and sent to a server in association with each base station identifier. This becomes the Wi-Fi signature for the client device or a resource for which the signal strength is being measured. The server uses the signature along with signatures obtained from various other devices to estimate distances between registered clients and resources.

When in range, a mobile device can "see" (receive signals from) one or more base stations or wireless access points, and measures the strength of the radio signal it is receiving from these base stations, referred to as "Received Signal Strength Indicator" or RSSI. Because the measured RSSI of a base station varies from place to place due to the natural attenuation of radio signals with distance as well as the reflection, refraction, diffraction, and attenuation caused by the physical environment, the RSSI that a mobile device measures is sensitive to that device's location. A fixed resource such as a conference room also may be in range of one or more base stations, and may be given a set of signal strengths relative to each base station by a mobile device positioned near the fixed device.

A client portion runs as a program by which each client registers with a proximity server, reports a Wi-Fi signature, and/or queries for nearby people and places. The client may actually be registering and reporting on another resource's behalf, such as when registering some non-networked resource, such as a stairway. Upon registration, the client application receives a globally unique identifier (GUID) from the server that associates client data with which client.

Once registered, a client may report access points and their measured Wi-Fi signal strengths to the server. The reporting may be one-time, such as with a fixed device, or regularly, such as with a mobile client. The server will then be able to provide mobile clients with current proximity data when a user queries for it.

In one implementation, the server responds with two (possibly empty) lists of nearby instances of the requested type. The first list, in short range proximity, shows those instances of clients/resources of the desired type that have at least one detectable access point in common with the querying client, sorted roughly by distance. The second list, in long range proximity, contains instances that can be reached by "hopping" through access points with overlapping coverage, sorted by the number of hops required. Some of the instances found within hopping distance may be reported with an estimate of the amount of time it would take to travel to it.

The proximity server maintains metric and topological data about the physical layout of access points derived from Wi-Fi signatures. Time-stamped Wi-Fi signatures provide information regarding the physical layout of access points, and the layout information can in turn be used to aid the computation of long range proximity. The server computes the topology of the access points by examining which pairs of access points have been detected simultaneously by the same client. This indicates that the access points have physically overlapping coverage and are therefore considered adjacent. The proximity server 206 computes a table of pairs of access points and the minimum number of edges or hops between them, up to some maximum number of hops. This table is used to find people or things in long range proximity of a client, where long range indicates that the two scan sources share no detectable access points, but can be connected by some number of hops between adjacent access points. The number of hops is reported to clients to give the user a rough idea of the distance to a scan source in long range proximity. The metric relationship between access points is computed from the time stamps on the Wi-Fi signatures, which are used to find the transit times between pairs of access points, which can give a user an idea of how long it will take to travel to someone or something that appears on the long range proximity list.

Clients and other resources within short range proximity of a client are defined as those that share at least one access point with the client. In computing the short range list on the server, the list by is sorted by approximate distance from the client, wherein the distance between two scan sources is related to the similarity of their Wi-Fi signatures. To find a numerical function of the two Wi-Fi signatures that gives the physical distance separating the two clients, numerical features are created from the two signatures, including the number of access points in common between the two clients, the Spearman rank-order correlation coefficient which represents how closely the two clients ranked their common access points by signal strength, the sum of squared differences of signal strengths, and the number of access points unaccounted for in each list. Other features are feasible, although in a testing stage, the first two of these four features gave the best results.

The proximity detection of the present invention is also useful in detecting synchronous user operations between mobile devices for co-located collaboration, such as for stitching, which refers to sharing the screen coordinates, direction, and timing of pen strokes with other nearby devices to establish when a pen stroke spans the displays of two devices. The proximity detection of the present invention solves the problem of determining which devices to consider as candidates for potential synchronous user operations, since any device not within short range proximity is eliminated as a candidate.

Other advantages will become apparent from the following detailed description when taken in conjunction with the drawings, in which:

BRIEF DESCRIPTION OF THE DRAWINGS

FIGS. 4-7 are screenshots representing an example client program's user interface, for working with proximity-related information in accordance with an aspect of the present invention;

FIG. 9 is a screenshot representing an example client program's user interface for sending an email message to a nearby client as determined via proximity-related information in accordance with an aspect of the present invention.

DETAILED DESCRIPTION

Exemplary Operating Environment

Figure 1:
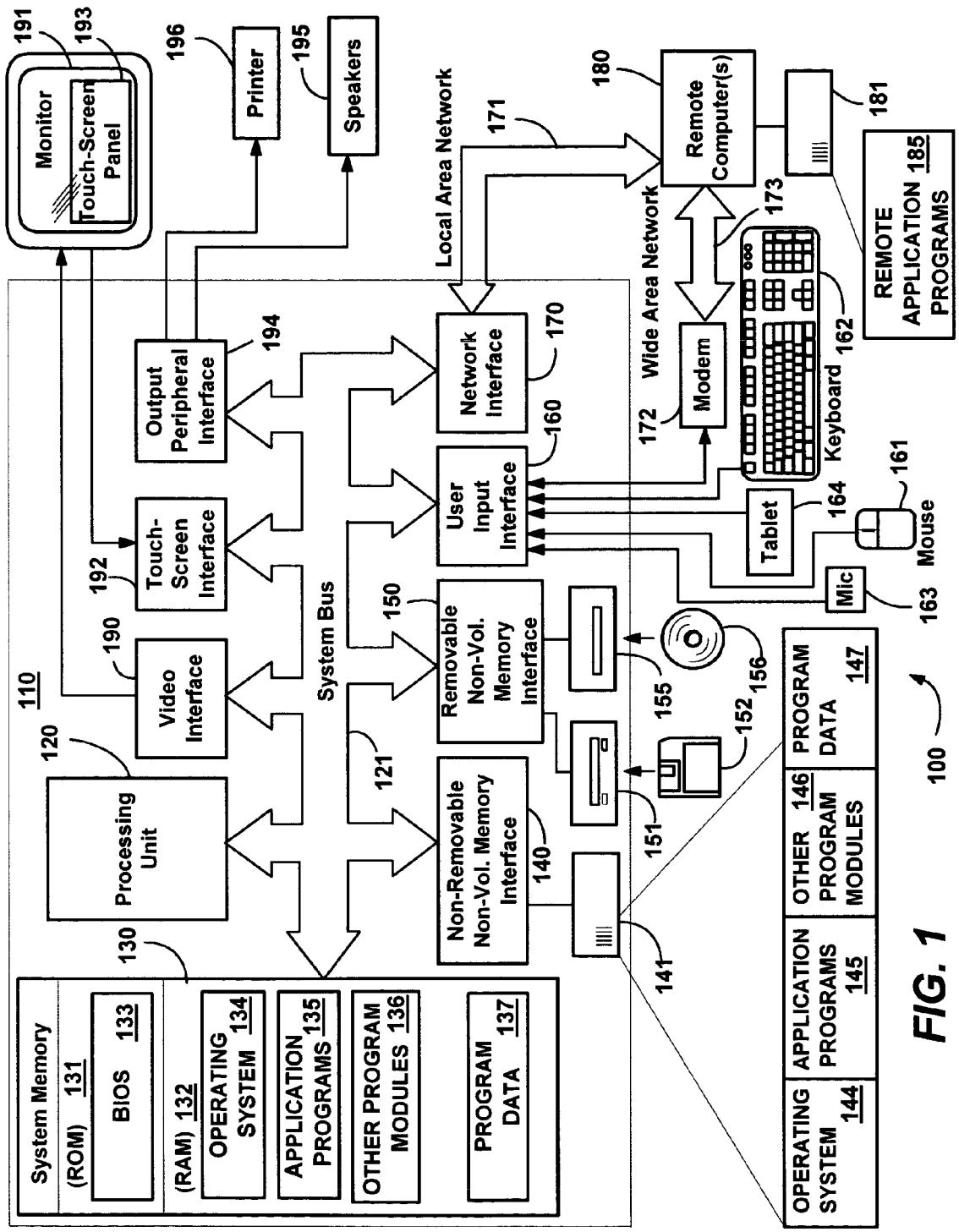
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170, and particularly may include one configured for wireless networking. When used in a WAN networking environment, the computer 110 may also include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Proximity Detection

The present invention is in part directed towards a method and system that use radio signal strengths from a wireless computer network to estimate which other resources (including mobile, wireless devices and possibly their owners) are in physical proximity. While the examples herein generally refer to mobile network devices in the form of portable computer systems such as tablet personal computers, it should be understood that virtually any device capable of transmitting information to a wireless network can participate in the proximity detection schemes described herein. Further, a resource (particularly one which is fixed) need not transmit the information, but can have a computing device transmit the information on its behalf, or otherwise have data entered for it, such as manually based on calibration readings. Moreover, sources other than radio waves can be used to detect proximity of devices having suitable sensors, such as sound waves and light patterns. In general, anything that can be sensed by some mechanism that has characteristics local to some area may be used to compute (or help compute) proximity. Thus, although radio is primarily described herein, proximity detection based on the principles of the present invention may apply to many other concepts, and thus the term "network" need not be an actual computer network, the terms "signal" and "signal strength" are intended to encompass any sensed information that varies based on location, and "base station" or "base stations" represent any signal source or sources from which data can be sensed or entered.

Moreover, participation need not be symmetrical, in that, for example, a device can transmit its signal strength data for proximity detection purposes without receiving similar data from other devices or resources, in essence describing its location but not concerning itself with the location of other devices. For example, a device can receive proximity-related data of other network devices without transmitting its signal strength data. Conversely an individual can wear a small transmitting device that essentially announces the individual's location but does not process data related to detecting other devices in proximity. Not receiving other device's proximity information is appropriate for non-computerized resources such as a restroom, where the resource may be represented by a set of signal strengths that were measured (e.g., only once) in a calibration step. Note that as used herein, although much of the description exemplifies the use of wireless computing devices, the term "resource" includes the concept of such a wireless device and/or any other type of computing device, as well as non-networked or even non-electronic devices when appropriate. In general, a resource thus can be anything that has associated signal strength data, such as actual, current signal strength data of a mobile computing device, or pre-measured or simulated data stored for a fixed resource or the like. Thus, a receptionist desk, a restroom, a first aid station, a vending machine and so on may each be a resource for which proximity can be measured or reasonably estimated, as long as actual or otherwise computed signal strength information corresponding to the resource's general information is known and can be mused as a signal strength "signature" for that resource.

Figure 2:
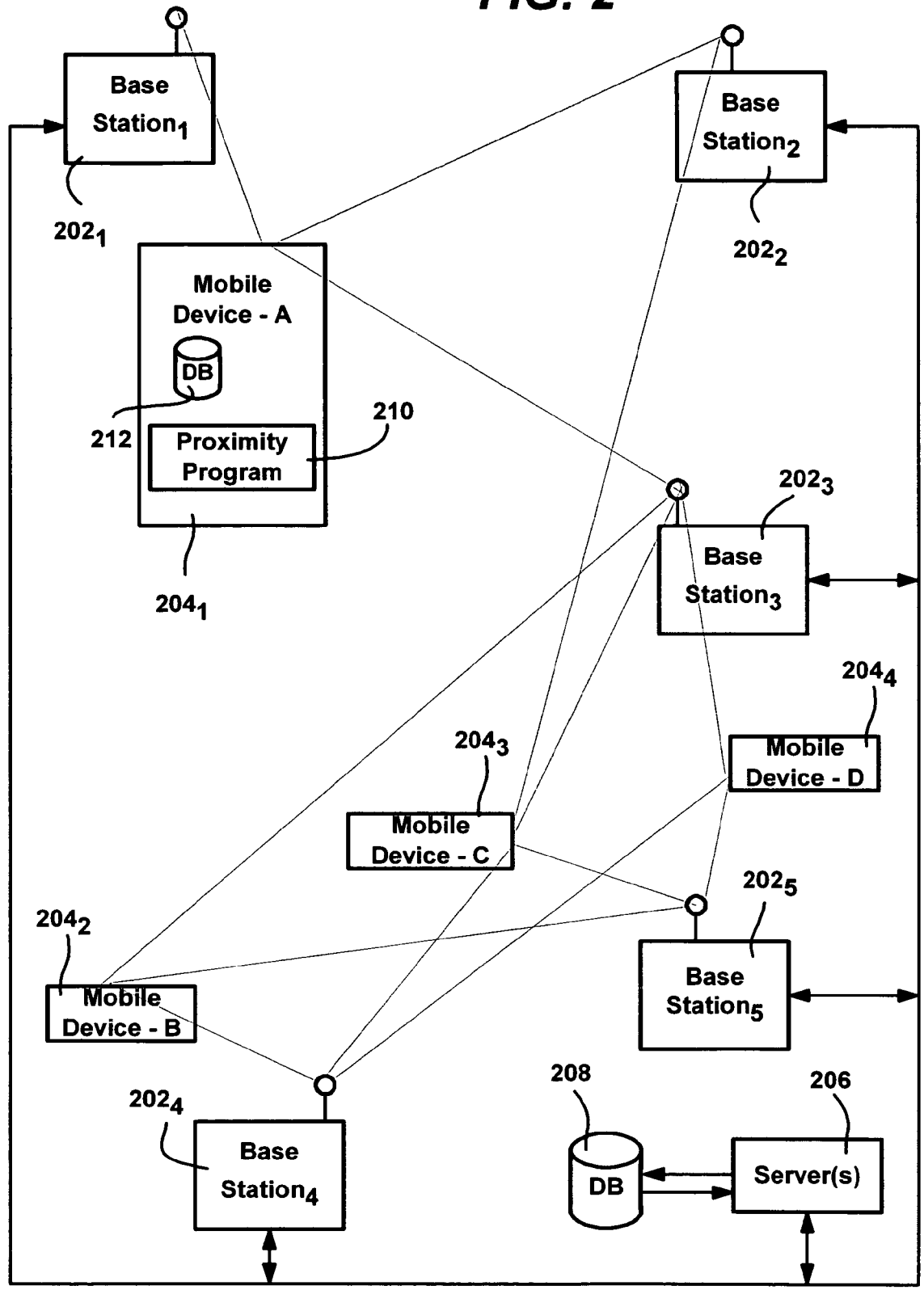
FIG. 2 is a block diagram generally representing a network, including a plurality of base stations having wireless connections to a plurality of network devices, configured to use signal strength data in accordance with an aspect of the present invention.

As generally represented in FIG. 2, a wireless network 200 is normally composed of multiple, statically mounted, wireless base stations (five are shown in FIG. 2, labeled $202_1$-$202_5$, although it is understood that any practical number may be present) that simultaneously communicate over radio frequencies to wireless devices (four are shown, $204_A$-$204_D$, which can again be any practical number) and over network cables with a wired network. When in range, each mobile device can "see" (receive signals from) one or more of these base stations, and measure the strength of the radio signal it is receiving from these base stations. This measurement is often referred to as "RSSI," for "Received Signal Strength Indicator." Note that the measured RSSI of a base station varies from place to place due to the natural attenuation of radio signals with distance as well as the reflection, refraction, diffraction, and attenuation caused by the physical environment, like walls, floors, ceilings, and furniture. Thus, the RSSI that a mobile device measures is sensitive to that device's location.

Figure 3:
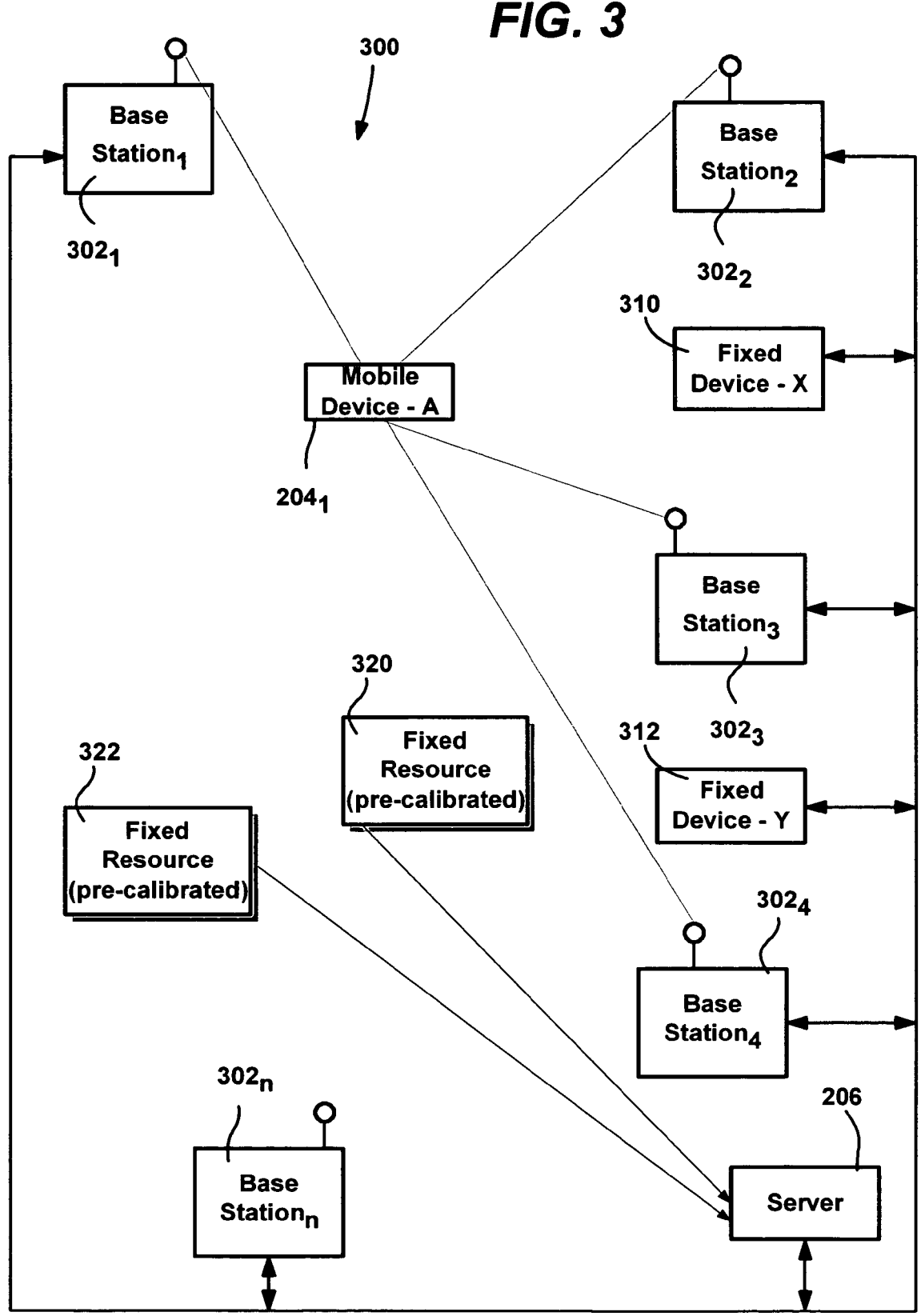
FIG. 3 is a block diagram generally representing another network, including a plurality of base stations having wireless connections to a plurality of network devices, configured to use signal strength data in accordance with an aspect of the present invention.

Moreover, the other resources that are discoverable need not actually be mobile, but can, for example use simulated signal strengths measured or computed in some other manner. FIG. 3 shows an alternative implementation in which there are one or more fixed, wired devices in a network 300 (two fixed devices labeled 310 and 312 are shown in FIG. 3) that participate in proximity detection. Note that "fixed" as used herein only means that the device or resource is not typically moved around, e.g., a printer is not ordinarily moved around like a mobile device is, and thus may be considered fixed.

In one alternative, each participating fixed resource may be given a set of signal strengths relative to each base station, which are thereafter reported (e.g., one time) to the server so that their existence can be reported in response to client queries. A mobile device positioned near the fixed device or resource may be used to obtain the readings, which may then be manually input or transferred to the fixed device in some manner, or reported from the mobile device to the server on behalf of the fixed resource. In this way, non-networked and non-electronic resources such as stairs, bathrooms, elevators or vending machines may be set to participate, as represented in FIG. 3 by the pre-calibrated fixed resources 320 and 322. Alternatively, the fixed device may obtain its own readings, such as by being configured with at least some signal strength detection capabilities. Once configured in its fixed location, the signal strengths of the fixed device may be left alone, or they may be updated, such as each time the fixed device connects to a wireless device to perform some functionality.

By way of example, consider a user of a mobile device looking for a printer, such as one of a number of printers made available to users and thus configured to participate in proximity detection. A mobile user can query the server for the nearest printer, (or other resource, such as a vending machine). In the example of FIG. 3, based on signal strengths the user of mobile device A would be informed that fixed device X was nearest at the present time, along with some information about fixed device X, such as the fact that it is a printer, a link to a device driver for that printer on the network, directions to the exact location of the printer, and so forth. Such information may be loaded from a database as with any other participating user, or may be provided to the mobile device A in some other way, such as from the server as part of the printer-location functionality.

In general, an implementation of the present invention operates by having each wireless device scan for a list of "visible" access points, and obtains the signal strengths from each of those access points. For example, in FIG. 2, the mobile device $204_1$ scans for and obtains the signal strengths for three access points, namely the base station $202_1$, the base station $202_2$ and the base station $202_3$. Each of the devices then transmits this data to a central server 206 (or set of servers) which compares the signal strengths and returns an inference on whether or not any two devices are in proximity. As can be readily appreciated, other alternatives, such as a peer-to-peer model which needs no server to perform the proximity computation, are also capable of enabling proximity detection in accordance with the present invention.

To determine the signal strengths, the clients (e.g., $204_1$-$204_4$) each assemble an array of MAC addresses, one unique address for each access point seen. Each client also assembles a corresponding array of signal strengths from each of the visible access points. In the client-server model, these arrays are transmitted by each of the clients to the server 206.

To detect signal strengths, passive or active scanning may be employed. Passive scanning involves the client tuning to a channel and listening for a period of time for valid 802.11 packets received from the base stations (access points) on that channel. The packets received are usually Beacons from the base stations at 100 msecond intervals, but this period cannot be guaranteed. Active scanning involves the client tuning to a channel and sending a Probe request with an SSID equal to the broadcast SSID or SSID equal to a valid SSID. A base station that receives a Probe Request with an SSID equal to the broadcast SSID or SSID equal to its own SSID will respond to the client with a Probe Response.

A proximity client may scan (actively or passively) all 802.11 channels to determine the RSSI of base stations on those channels. Alternatively, a proximity client may scan (actively or passively) a subset of channels for a specified minimum and maximum durations to optimize performance and reduce the adverse impact to the client. Note that these two methods may be used in conjunction to improve performance. For example, all-channel scanning may be performed on a regular basis for roaming purposes. Then, the results can be used to determine the active subset of channels for subset scanning, with the frequency of subset scanning being greater than the frequency of all-channel scanning.

Turning to an explanation of the software that facilitates proximity detection, the client portion of the present invention is a program that users run in order to interact with the proximity server 206. In one implementation, the programmatic interface to the server is a web service which presents a simple set of APIs for a client to use, making it easy to write new clients, e.g., for the Windows® XP operating system, Pocket PC operating system, an active server page (ASP) that for example runs in a conventional web browser in response to a URL that has the signal strength and related data encoded as simple ASCII parameters, and so on. In one implementation, the web service interface to the server is based on the simple object access protocol (SOAP), whereby any SOAP client could access the service, including those running another platform.

In general, each client registers with a proximity server, reports a Wi-Fi signature, and/or queries for nearby people and places. Note that as described above, the client may actually be registering and reporting on another resource's behalf, such as when using a pocket PC to register a stairway. Although a general Windows®-based client is described herein to demonstrate the system's functionality, it can be readily appreciated that non-Windows®-based clients are equivalent. Further, although the present invention is described with reference to an environment in which most of the work is performed by the server, it is understood that a peer-to-peer model may be implemented, or a model in which more of the work is shifted to the clients.

Figure 4:
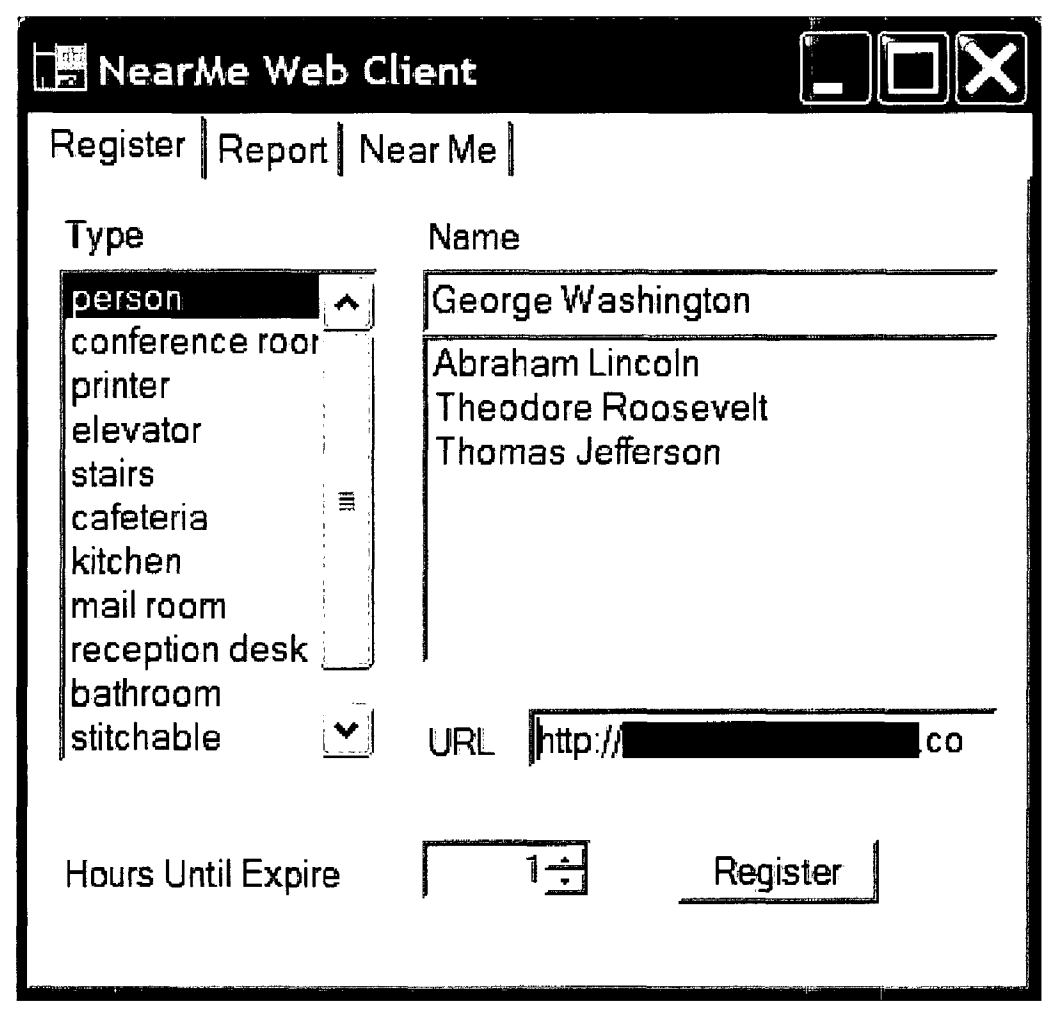

A first step in using the proximity server is for the client to register with a chosen name, such as via the example user interface represented in FIG. 4. New users enter any appropriate name, and may enter a uniform resource locator (URL) that others can use to look up more information about that client. Users also choose an expiration interval, e.g., in hours or other suitable units, which serves as a trigger for the server to automatically delete old users. Moreover, the expiration interval allows a user's name to be automatically removed from the server to help preserve privacy after he or she is no longer using the server. For example a user may register with the server at the beginning of a meeting in order to find the names of other people in the same room. Since this user knows the meeting will end in one hour, the expiration interval may be set to one hour, meaning the user does not need to remember to remove the username from the server after the meeting.

Upon registration, the client application receives a globally unique identifier (GUID) from the server. This GUID is used by the server to identify which data to associate with which client. If a user quits the client application and wants to restart later, the registration function gives him or her opportunity to register as a previous user instead of a new one. The server then responds with the GUID of the chosen previous user which is used by the client to tag future transmissions.

A user can register as a person or as another resource type, as listed in the table below, (the types are not limited to these examples):

---
Person
conference room
Printer
Elevator
Stairs
Cafeteria
Kitchen
mail room
reception desk
Bathroom
stitchable device
demo person

---

The non-person types are intended to allow a user to tag an object or location with a Wi-Fi signature. A suitable security mechanism may be provided to prevent a user from inadvertently or maliciously registering something incorrectly (which could, for example, make something appear to be nearby other users when it does not exist). For example, for an enterprise, an alternative, more secure registration method may use something like a username/password scheme. A wider deployment could use a publicly accessible authentication service such as Microsoft Corporation's Passport.NET to authenticate users. Also, a user may limit visibility to just a certain group, like his or her list of instant messenger buddies.

Each registered non-person instance is also given a name, but there is not necessarily an expiration interval; a fixed resource can thus remain that way without recalibrating. Maintenance can be performed on the proximity server to remove resources that were considered permanent but are no longer, e.g., a printer may be moved. Once tagged, human users can query the server for nearby instances of these resource types, as well as nearby instances of other registered users.

Figure 5:
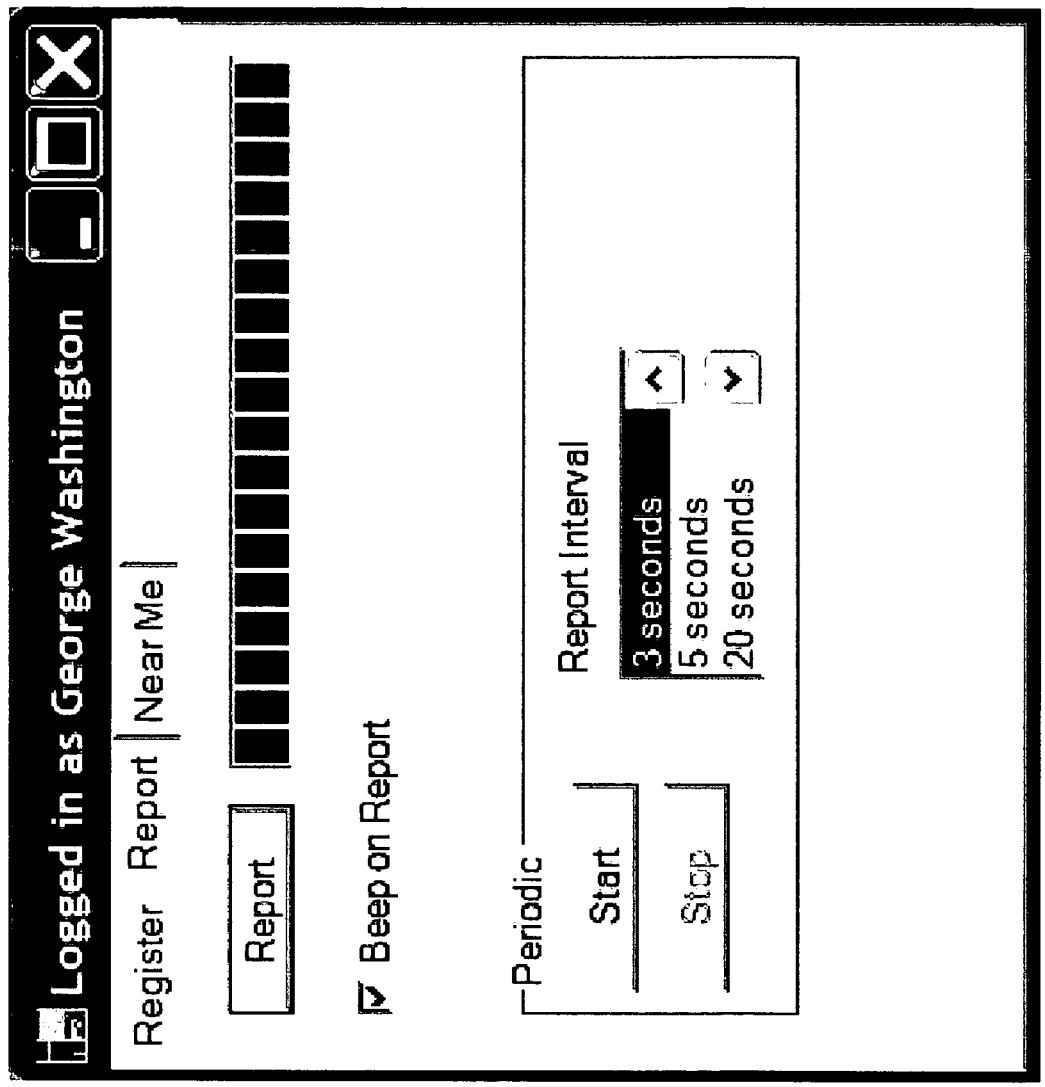

Once registered, a client may report access points and their measured Wi-Fi signal strengths to the server, as represented in FIG. 5. The client program allows the user to make a one-time report, or set up a periodic series at a chosen time interval. The periodic mode is intended to be used by a moving client. In one implementation, the client makes generic API calls to retrieve a list of access point Media Access Control (MAC) addresses, which are six byte identifiers that uniquely identify 802.11 access points. The client retrieves one MAC address for each detectable access point, and for each one lists the associated received signal strength indicator (RSSI) as detected at its (e.g., 802.11) wireless device. This list is the Wi-Fi signature. Note that RSSI is normally measured in decibels referred to one milliwatt, or dBm, typically ranging from approximately −100 dBm to −20 dBm, and may be reported as an integer. Further, note that RSSI from a given access point generally decreases with distance from that access point, but it is also affected by attenuation and reflection, making the relationship between location and RSSI complex. Clients ordinarily give an 802.11 network interface card (NIC) at least three seconds to scan for access points after the scan is triggered. In one implementation, the client does not filter detected access points, so the list can contain access points associated with any network, whether or not the client has credentials to interact with that network. The client may also detect access points with no network connection that are effectively functioning as only location beacons.

The set of MAC addresses and signal strengths is the Wi-Fi signature. The client's report comprises the client's GUID and Wi-Fi signature, which can be represented as:

$$\{GUID,(m_1,s_1),(m_2,s_2),\ldots,(m_n,s_n)\}$$

for n detectable access points, where $m_i,s_i$ are the MAC address and RSSI of the $i^{th}$ detected access point, respectively. These ordered pairs are not reported in any particular order, but for example, could be ordered such as from strongest to weakest, or in some other manner that distributes some of the server workload to the clients.

Clients may also query for nearby people or places, as shown in FIGS. 6 and 7. The user selects a desired resource type query, e.g., other people or something else from the list of types such as a printer, a conference room, a reception desk (FIG. 7) or other. In one implementation, the server responds with two (possibly empty) lists of nearby instances of the requested type. The first list, in short range proximity, shows those instances that have at least one detectable access point in common with the querying client, sorted roughly by distance. The second list, in long range proximity as described below, contains instances that can be reached by "hopping" through access points with overlapping coverage, sorted by the number of hops required. Some of the instances found within hopping distance are also reported with an estimate of the amount of time it would take to travel to it.

Other variations are feasible, including using proximity detection as an "alert" for the user, e.g., a user who is walking thru a city and wants to know when he or she gets near a certain type of store or restaurant, and the user's device can provide such a notification. Also, the present invention can provide an alert when someone who shares one or more of a user's interests or has a service/good that is being sought is nearby, (e.g., in a conference, commerce, or social setting).

As described above, in one model, the present invention includes a central proximity server (or set of communicating servers) 206 used to collect signal strength data and to distribute signal strength and/or proximity data to the mobile clients $204_A$-$204_D$. In this model, at least some of the mobile proximity clients that participate in proximity detection send signal strength data to the central server 206, and query the server 206 for signal strength and/or proximity data. A database 208 is also shown, although it can be considered part of the server. Note that information beyond device identifier, strengths and/or lists may be provided to clients, such as biographical data (e.g., images and text) for a user of each device; furthermore this database could allow performance of additional queries such as common or differing profile elements.

Thus, the proximity server 206 comprises a central computer used to store signal strength data contributed by participating mobile proximity clients, e.g., the clients $204_A$-$204_D$ in FIG. 2. The server stores each signal strength report as it comes in, such as in a cache and/or non-volatile storage. In one implementation, the proximity server 206 comprises a SQL database that maintains tables of active users, static resources (e.g., printers and conference rooms), and their associated Wi-Fi signatures. From the server's perspective, the people or places associated with Wi-Fi signatures are scan sources. Along with a scan source type, each scan source is represented with a GUID, a friendly name, an optional URL, an optional email address, and an expiration time (primarily for people). The proximity server 206 uses tables to respond to client requests, e.g., posed through an API in the form of a web service. The proximity server 206 checks for expired scan sources, e.g., every hour, and deletes their names.

On the server, each Wi-Fi signature is tagged with the GUID of its scan source and a sever-generated time stamp. Wi-Fi signatures are not ordinarily deleted, even if their associated scan source is deleted due to expiration. Note that for privacy, because they are only identified with the GUID of the scan source, such orphaned signatures cannot be traced back to their originating scan source. The Wi-Fi signatures are preserved in order to compute tables describing the layout of access points.

More particularly and in accordance with another aspect of the present invention, the proximity server 206 maintains metric and topological data about the physical layout of access points derived from Wi-Fi signatures. Time-stamped Wi-Fi signatures are a valuable source of information regarding the physical layout of access points. Layout information can in turn be used to aid the computation of long range proximity. The proximity server 206 processes the Wi-Fi signatures in two ways.

Figure 8:
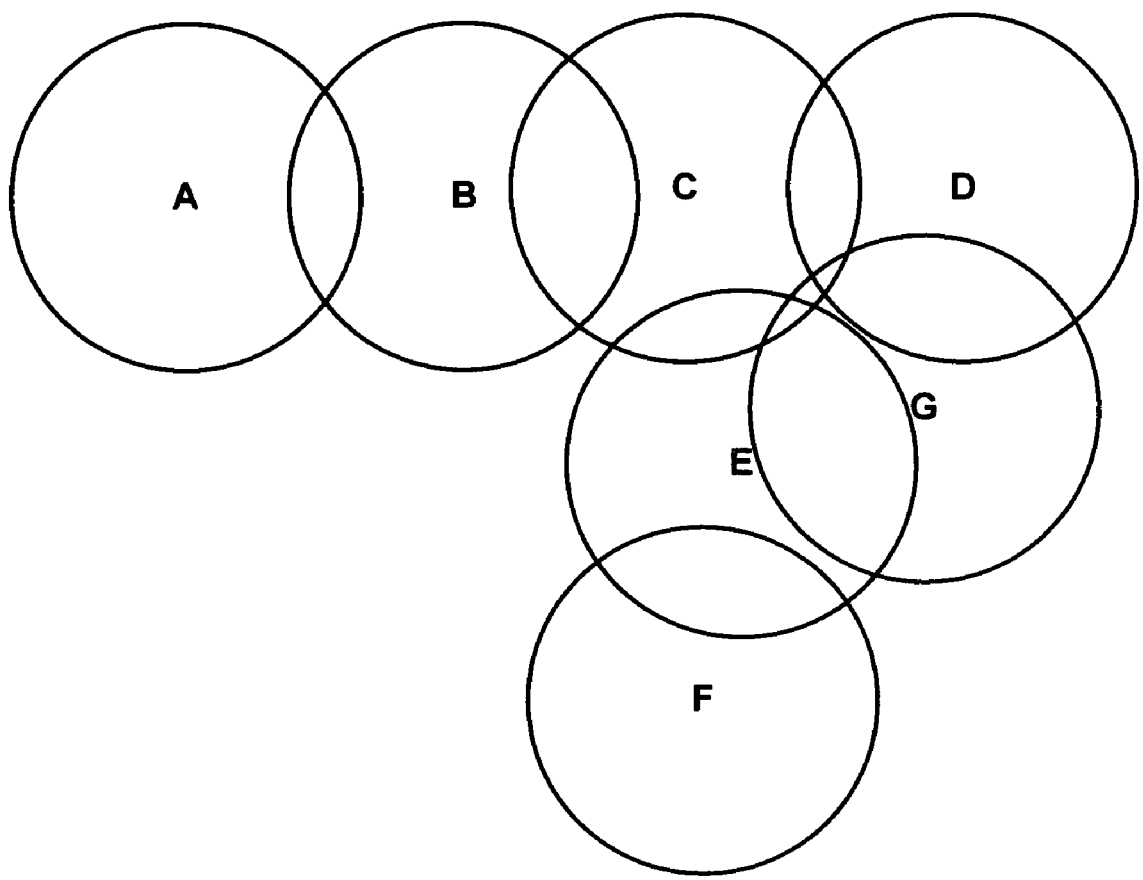
FIG. 8 is a representation of how access points may be conceptually mapped to a graph to provide long-range proximity data, in accordance with an aspect of the present invention.
Figure 8:
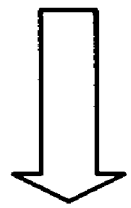
Figure 8:
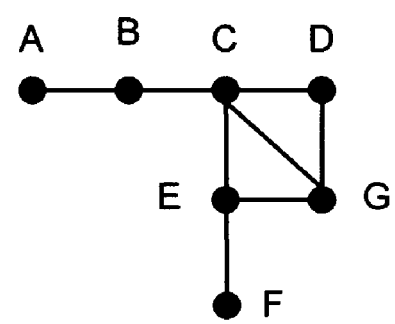

First, the server computes the topology of the access points by examining which pairs of access points have been detected simultaneously by the same client. This indicates that the access points have physically overlapping coverage and are therefore considered adjacent. Note that adjacent access points do not have to be on the same network backbone nor even on any backbone at all. Conceptually, the proximity server 206 builds an adjacency matrix of access points with overlapping coverage. From this matrix, the proximity server 206 computes an undirected graph with access points as nodes and edges between adjacent nodes, as generally represented in FIG. 8, where clients have reported from access points A through G. In reality, the proximity server 206 computes a table of pairs of access points and the minimum number of edges or hops between them, up to some maximum number of hops (currently eight). The proximity server 206 server is programmed to recompute this table on occasion, such as every hour, in order to keep up to date with the latest Wi-Fi signatures. In this way, the physical scope of the environment known to the proximity server 206 automatically grows as more users report Wi-Fi signatures from more locations. This table is used to find people or things in long range proximity of a client, where long range indicates that the two scan sources share no detectable access points, but can be connected by some number of hops between adjacent access points. The number of hops is reported to clients to give the user a rough idea of the distance to a scan source in long range proximity.

This table of adjacent access points is also used as an anti-spoofing guard. Clients can be optionally programmed with a web service call that checks to see if the access points in a Wi-Fi signature have ever before been seen together by any other client. If they have not, this raises the suspicion that the Wi-Fi signature is not valid and that it was created artificially. While this anti-spoofing check helps maintain the integrity of the database, it also prevents any growth in the list of adjacent access points, so it is only used on untrusted clients.

A second piece of layout information concerns the metric relationship between access points, and it comes from the time stamps on the Wi-Fi signatures. These are used to find the minimum transit times between pairs of access points, which can give a user an idea of how long it will take to travel to someone or something that appears on the long range proximity list. Of course, something other than a minimum may be used, such as a mean or average (so that a running user does not skew the estimated time to something unrealistic for most people). On occasion such as every hour, the proximity server 206 is programmed to create groups of Wi-Fi signatures that share the same GUID, meaning they came from the same scan source (e.g., the same person). The proximity server 206 constructs the possible unique pairs of access points within each group, and for each member of each pair, the server looks up their respective time stamps and assigns the resulting time interval to the pair. These pairs are recombined, where all but the minimum (or other time such as average) time interval is kept for duplicate pairs. The result is a list of MAC address pairs and the minimum time any client was able to transition between them. These times are included in the list of scan sources in long range proximity, as shown in FIGS. 6 and 7. The times serve as an upper bound on how long it would take to travel directly to that scan source; it is an upper bound because there is no guarantee that the minimum time observed actually came from a direct traverse between the two access points. As is understood, an alternative version of this analysis may cluster travel times between access points to account for the different speeds of different possible modes of transportation, like walking, biking, and driving.

Both the topological and metric tables provide valuable proximity information and are computed automatically, without any extra calibration work required from either the human clients or the maintainer of the system. Although the data for these tables is contributed by human users, it becomes anonymous by default after expiration. As can be readily appreciated, this type of long-range proximity information may be used to find people and places that might typically be out of range of one access point, such as a receptionist desk in a large office building, a cafeteria, a friend on campus, or a custodian. The travel time data would be useful for picking the nearest of the requested items as well as to plan how much time to allow to reach it.

The long range proximity tables are computed based on the past data submitted to the server. If access points in the environment are removed or added, long range proximity computations will still be valid. Moving an access point, especially to another part of the topology, creates invalid graph links, which can be adjusted for by expiring access points older than a certain threshold.

The database of access points is not dependent on traditional techniques which require that access point data must include absolute locations. Instead, the database is built up in the normal course of client usage, providing the names of locations of interest, such as printers and conference rooms. Note that while the present invention does not provide absolute locations, more traditional databases could be easily adapted to work in conjunction with the proximity data, and vice-versa.

In accordance with another aspect of the present invention, clients and other resources within short range proximity of a client are defined as those that share at least one access point with the client. In computing the short range list on the server, it is useful to sort the list by distance from the client. Then a user can, for instance, pick the nearest printer or pick the N nearest people.

In accordance with an aspect of the present invention, the distance between two scan sources is related to the similarity of their Wi-Fi signatures. If scan sources see several access points in common, and if the signal strengths from those access points are similar, then it is more likely that the two are nearby each other.

Consider two Wi-Fi signatures from clients a and b:

$$\{(m_1^{(a)}, s_1^{(a)}), (m_2^{(a)}, s_2^{(a)}), \ldots, (m_{n_a}^{(a)}, s_{n_a}^{(a)})\} \text{ and}$$
$$\{(m_1^{(b)}, s_1^{(b)}), (m_2^{(b)}, s_2^{(b)}), \ldots, (m_{n_b}^{(b)}, s_{n_b}^{(b)})\}.$$

wherein the m's are the AP MAC addresses, and the s's are the associated signal strengths. Client a detected $n_a$ access points and client b detected $n_b$. In order to define similarity features, the present invention first forms the set of access points that were detected by both clients and the associated signal strengths from each client:

$$\{(m_{\cap,1}, s_{\cap,1}^{(a)}, s_{109,1}^{(b)}), (m_{\cap,2}, s_{\cap,2}^{(a)}, s_{\cap,2}^{(b)}), \ldots, (m_{\cap,n_\cap}, s_{\cap,n_\cap}^{(b)})\}$$

Here there were $n_\cap$ access points that were detected by both clients, the $i^{th}$ of which was $m_{\cap,i}$, which clients a and b measured at signal strengths $s_{\cap,i}^{(a)}$ and $s_{\cap,i}^{(b)}$, respectively.

To find a numerical function of the two Wi-Fi signatures that gives the physical distance separating the two clients, numerical features are created from the two signatures. Four such features include:

1. The number of access points in common between the two clients, represented by $n_\cap$. We expect that an increased $n_\cap$ is an indication of shorter range.

2. The Spearman rank-order correlation coefficient, denoted by $\rho_s$. This number represents how closely the two clients ranked their common access points by signal strength. Intuitively, a more similar ranking indicates the clients are closer together. The advantage of ranking is that different radio recievers, such as the Wi-Fi NICs in the clients, may well measure signal strengths in different ways. The ranking of the access points by signal strength will be the same on both clients if they both receive the same signal strengths and they both have a monotonic function relating input and measured signal strengths. While this ignores information contained in the absolute signal strengths, it is robust to inevitable variations in NICs, including differences in design, manufacturing, shielding, and antenna orientation. Mathematically $\rho_s$ is computed by first making two sorted lists of the signal strengths seen in common by both clients. For example, these lists might be $(s_{\cap,1}^{(a)}, s_{\cap,2}^{(a)}, s_{\cap,3}^{(a)}) = (-70, -50, -80)$ and $(s_{\cap,1}^{(b)}, s_{\cap,2}^{(b)}, s_{\cap,3}^{(b)}) = (-90, -60, -70)$. In each list, each signal strength is replaced with the ascending rank of that signal strength in its own list to make two rank lists, e.g., $(r_1^{(a)}, r_2^{(a)}, r_3^{(a)}) = (2,3,1)$ and $(r_1^{(b)}, r_2^{(b)}, r_3^{(b)}) = (1,3,2)$. The Spearman $\rho_s$ is given by:

$$\rho_s = \frac{\sum_i (r_i^{(a)} - \bar{r}^{(a)})(r_i^{(b)} - \bar{r}^{(b)})}{\sqrt{\sum_i (r_i^{(a)} - \bar{r}^{(a)})^2} \sqrt{\sum_i (r_i^{(b)} - \bar{r}^{(b)})^2}}$$

where $\bar{r}^{(a)}$ and $\bar{r}^{(b)}$ are the means of the ranks. In the example, $\rho_s = 0.5$; $\rho_s$ ranges from $-1$ to $1$, indicating poor to exact correlation between rankings, respectively.

3. Sum of squared differences of signal strengths:

$$c = \Sigma_i (r_i^{(a)} - r_i^{(b)})^2$$

A smaller value of c indicates more similar signal strengths and presumably shorter range. This does not account for the variability in measuring signal strengths that the ranking coefficient $\rho_s$ is intended to ignore.

4. Number of access points unaccounted for in each list. This indicates the number of "left over" access points that are not in the list of common access points, $n_u = n_a + n_b - 2n_\cap$. More unaccounted for access points could indicate that the clients are farther apart.

To find a function that takes some or all of the features of a pair of Wi-Fi signatures from the four features above, and return an estimate for the physical distance between them, polynomials were chosen, as there are no well-established physical models that relate these features and distance. By varying the order of the polynomials, $N_o$, from one to four, and varying the number of features, $N_f$, from one to four, for each $N_f$ all $(4N_f)$ ("4 choose $N_f$") possible combinations of features were tested. For example, if $N_o = 2$, $N_f = 3$, and the three features were $n_\cap$, $\rho_s$, and c, then the polynomial would be:

$$d = a_{000} + a_{100} n_\cap + a_{010} \rho_s + a_{001} c +$$
$$a_{110} n_\cap \rho_s + a_{101} n_\cap c + a_{011} \rho_s c + a_{200} n_\cap^2 + a_{020} \rho_s^2 + a_{002} c^2$$

where d is the physical distance between the locations at which the two Wi-Fi signatures were taken, and the a's are the coefficients we estimated using least squares. In computing the coefficients, weighted least squares were used to equalize the influence of each possible pair of NICs, because each NIC was not represented exactly equally in the experimental data.

To compute polynomial coefficients from the large number of data points, the actual least squares fitting was performed on ten subsets, each comprising a random 10% of the data, with the coefficients that gave the minimum rms distance error from each subset being kept. The results are shown in the following table:

| Number of Features | Feature(s) | Poly-nomial Degree | RMS Err (m) Train | RMS Err (m) Test | Spearman ρ Train | Spearman ρ Test |
|---|---|---|---|---|---|---|
| 1 | APs In Common | 1 | 7.13 | 14.23 | −0.36 | 0.30 |
|   |               | 2 | 7.25 | 14.22 | −0.36 | 0.30 |
|   |               | 3 | 7.13 | 14.24 | 0.32 | 0.30 |
|   | Spearman ρ    | 1 | 7.26 | 14.85 | 0.19 | 0.19 |
|   |               | 2 | 7.22 | 14.67 | 0.17 | 0.22 |
|   |               | 3 | 7.20 | 14.63 | 0.19 | 0.19 |
|   | RSSI Difference | 1 | 7.58 | 15.09 | −0.27 | 0.26 |
|   |               | 2 | 7.63 | 15.08 | −0.26 | 0.26 |
|   |               | 3 | 7.44 | 15.04 | 0.33 | 0.29 |
|   | Unaccounted for APs | 1 | 7.23 | 15.23 | 0.31 | 0.30 |
|   |               | 2 | 7.16 | 15.24 | 0.31 | 0.30 |
|   |               | 3 | 7.09 | 15.13 | 0.31 | 0.30 |
| 2 | APs In Common Spearman ρ | 1 | 6.83 | 14.04 | 0.38 | 0.39 |
|   |               | 2 | 6.75 | 14.19 | 0.41 | 0.34 |
|   |               | 3 | 6.74 | 14.26 | 0.41 | 0.32 |
|   | APs In Common RSSI Difference | 1 | 7.10 | 14.31 | 0.39 | 0.39 |
|   |               | 2 | 7.12 | 14.38 | 0.22 | 0.39 |
|   |               | 3 | 6.96 | 14.16 | 0.40 | 0.39 |
|   | APs In Common Unaccounted for APs | 1 | 6.87 | 14.57 | 0.39 | 0.35 |
|   |               | 2 | 6.83 | 14.78 | 0.40 | 0.35 |
|   |               | 3 | 6.83 | 14.80 | 0.40 | 0.34 |
|   | Spearman ρ RSSI Difference | 1 | 7.24 | 14.80 | 0.15 | 0.26 |
|   |               | 2 | 7.24 | 14.68 | 0.12 | 0.09 |
|   |               | 3 | 7.07 | 14.68 | 0.29 | 0.37 |
|   | Spearman ρ Unaccounted for APs | 1 | 7.00 | 15.08 | 0.33 | 0.31 |
|   |               | 2 | 6.91 | 14.91 | 0.36 | 0.33 |
|   |               | 3 | 6.83 | 14.99 | 0.36 | 0.33 |
|   | RSSI Difference Unaccounted for APs | 1 | 7.16 | 15.26 | 0.28 | 0.23 |
|   |               | 2 | 7.10 | 15.22 | 0.28 | 0.22 |
|   |               | 3 | 6.91 | 15.07 | 0.41 | 0.34 |
| 3 | APs In Common Spearman ρ RSSI Difference | 1 | 6.81 | 13.97 | 0.35 | 0.43 |
|   |               | 2 | 6.75 | 14.13 | 0.37 | 0.30 |
|   |               | 3 | 6.61 | 14.10 | 0.44 | 0.38 |
|   | APs In Common Spearman ρ Unaccounted for Aps | 1 | 6.69 | 14.20 | 0.43 | 0.41 |
|   |               | 2 | 6.58 | 14.42 | 0.45 | 0.38 |
|   |               | 3 | 6.52 | 14.47 | 0.46 | 0.35 |
|   | APs In Common RSSI Difference Unaccounted for APs | 1 | 6.88 | 14.39 | 0.38 | 0.33 |
|   |               | 2 | 6.88 | 14.55 | 0.38 | 0.30 |
|   |               | 3 | 6.70 | 14.51 | 0.44 | 0.36 |
|   | Spearman ρ RSSI Difference Unaccounted for Aps | 1 | 7.01 | 15.00 | 0.33 | 0.30 |
|   |               | 2 | 6.91 | 14.89 | 0.36 | 0.29 |
|   |               | 3 | 6.68 | 14.83 | 0.42 | 0.35 |
| 4 | APs In Common Spearman ρ RSSI Difference Unaccounted for APs | 1 | 6.71 | 14.30 | 0.42 | 0.40 |
|   |               | 2 | 6.64 | 14.60 | 0.44 | 0.35 |
|   |               | 3 | 6.43 | 14.49 | 0.49 | 0.36 |

In the table, the "Train" column under the "RMS Err (m)" column shows the rms error in meters after the least squares fit to an office building's data. The "Train" column under "Spearman ρ" shows how well the computed polynomial ranked the computed distances compared to the actual distances. The two "Test" columns show how well the office building polynomial coefficients worked on data taken in a cafeteria. In general, increasing the number of features and the degree of the polynomial did not significantly improve accuracy.

For the training data, the rms error was in the vicinity of seven meters, with a minimum of 6.43 meters for the third degree polynomial using all four features. Also evaluated was how well the computed polynomials ranked the distances using the Spearman rank correlation coefficient between the actual and computed ranked distances. (Note that Spearman is used twice: one as a way to measure the rank similarity of signal strengths and one as a way to assess how well the various polynomials rank physical distance compared to actual.) This is useful since some applications may want to present ranked lists of nearby people rather than their absolute distances. The maximum Spearman correlation for the training set was 0.49, also for the $3^{rd}$ degree polynomial using all four features. The polynomial coefficients from the office building training set were compared with the cafeteria data set, giving more information as to which features and functions can be used for any general situation. The cafeteria data gave reasonable performance with a minimum rms error of 13.97 meters and a maximum Spearman correlation of 0.43, both using a first degree polynomial on $n_\cap$, $\rho_s$, and c. The number of unaccounted for access points, $n_u$, was the worst performing single feature in terms of rms error on the test set. Intuitively, the most attractive features are $n_\cap$ (the number of access points in common) and $\rho_s$ (the Spearman correlation of the signal strengths), because they are robust to measurement differences between NICs. The test data indicates that the best performing polynomial for these two features was a first degree polynomial, giving an rms error of 14.04 meters and a Spearman correlation of 0.39, both very close to the best performance over all the test cases. The actual polynomial was:

$$d = -2.53 n_\cap - 2.90 \rho_s + 22.31$$

As expected, this equation indicates that the estimated distance in meters (d) decreases when more access points are seen in common ($n_\cap$) and when their relative rankings are more similar ($\rho_s$). One interesting aspect of this equation is that $\partial d/\partial n_\cap \approx \partial d/\partial \rho_s$, meaning that $n_\cap$ and $\rho_s$ have approximately the same level of influence on the estimated distance. Given this similarity in influence, if the goal is to sort Wi-Fi signature pairs by distance, a reasonable heuristic is to simply sort by the sum $n_\cap + \rho_s$, which in one implementation is done on the server to sort lists of instances in short range proximity.

Note that although this equation worked reasonably well for the two test data sets, the actual coefficients may not be broadly applicable to other locations where there will be differences in building materials, architecture, access point density, and access point transmission strength. One example of its possible inapplicability is in an area densely populated with access points. In such a case, $n_\cap$ could be large enough that the computed distance is negative. However, for proximity, a great deal of accuracy is not always necessary.

Short range proximity computations are robust to the addition and deletion of access points, because the distance computation is based on only the list of access points that two Wi-Fi signatures have in common. A moved access point could cause large errors if the server is not appropriately updated. However, for finding nearby people who are updating their Wi-Fi signatures frequently, the client allows even moved access points to be easily tolerated.

The sample client represented in FIGS. 4-7 allows people and places to be registered with a URL. For example, a user might register with a home page; for some places, like reception desks, a URL that gives a map to help visitors find their way may be registered. In one implementation, instances that have a registered URL will show up on the proximity lists with an ellipsis ("...") behind their name. A user can click on these names to bring up a web browser to display jthe contents at that URL. Each registered person and place is essentially tagged with a Wi-Fi signature that serves for filtering based on location. The changing lists or proximal people and places, along with their associated URLs, create a dynamic lookup service of what is available nearby.

Figure 9:
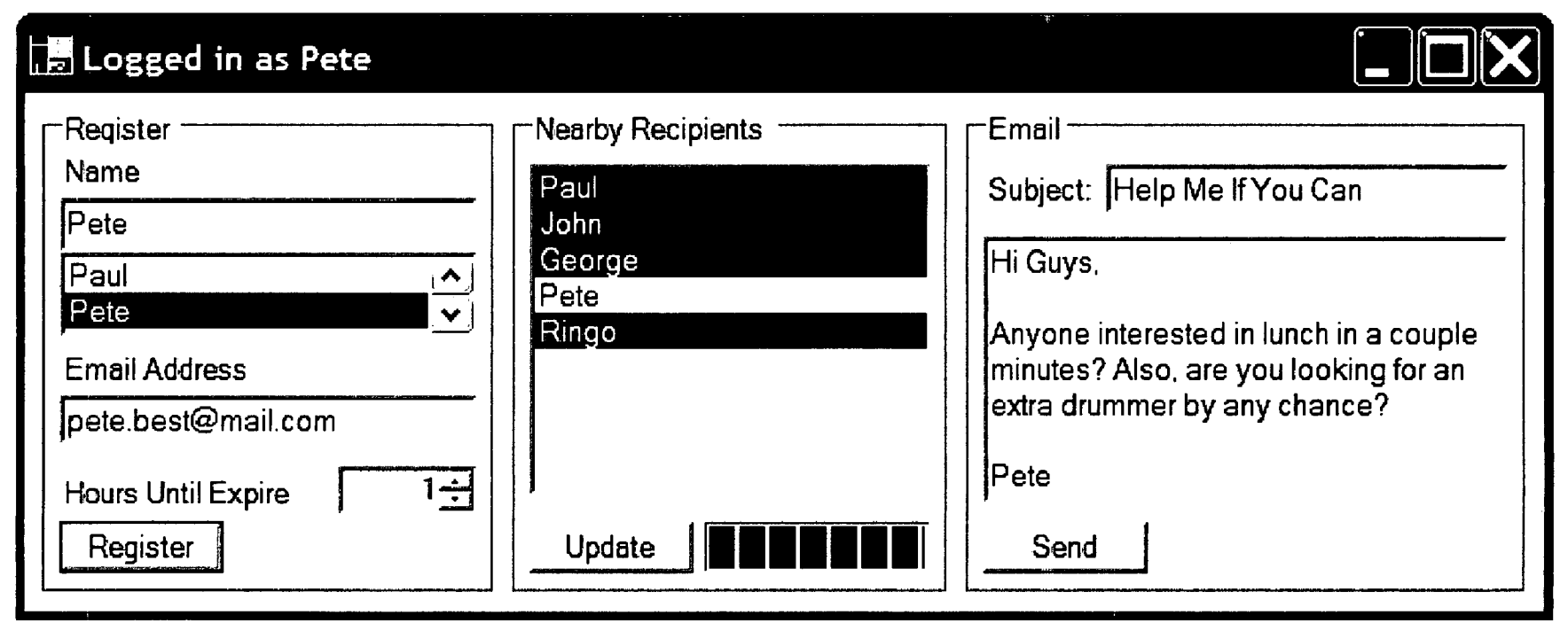

The screen shot of FIG. 9 shows a localized email program that allows a user to register with the proximity server with a name and email address. After updating the database with a Wi-Fi signature, a list of nearby registered users appears. The user can select names from this list and send an email to them, which would be useful for nearly immediate requests like going out td lunch or asking for face-to-face help with a problem. Other programs can alternatively send an instant message and/or automatically dial a telephone number of a registered user, provided this information is known. Because the list of potential recipients is sorted by physical distance, picking the top N in the list is equivalent to picking the N nearest people, up to the inherent distance approximation errors. Since the range resolution is presently in the tens of meters, its errors are likely tolerable for this application. Note that proximity can be used as one of a number of filters for email recipients, e.g., optionally used in addition to filters on recipient type and interest area.

Figure 10:
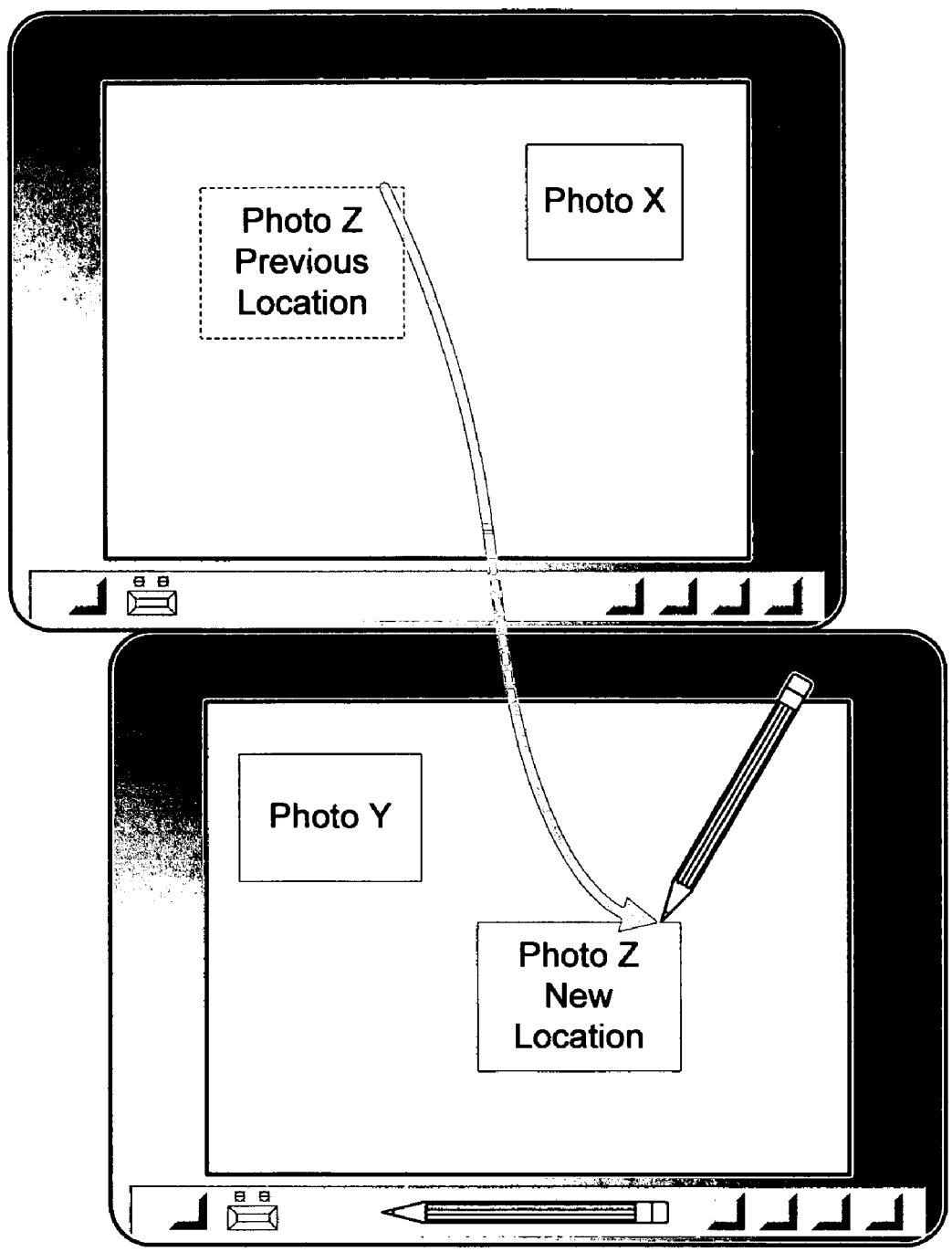
FIG. 10 is a representation of two computers stitched together, with their proximity confirmed in accordance with an aspect of the present invention.

In accordance with another aspect of the present invention, another client uses the proximity detection of the present invention to aid in detecting synchronous user operations between mobile devices that are associated for co-located collaboration. Stitching, synchronous gestures, and SyncTap are examples of such techniques. Stitching, for example, shares the screen coordinates, direction, and timing of pen strokes with other nearby devices to establish when a pen stroke spans the displays of two devices. For example, this makes it easy for users to drag a file between two separate pen-operated wireless devices, for example, as shown in FIG. 10.

A key problem in this class of systems is to determine which devices to consider as candidates for potential synchronous user operations. For example, SyncTap proposes using multicast to share user activity and timing with other devices, but this may needlessly send information to a large number of irrelevant devices that are too far apart to ever be intentionally associated. Restricting communications to devices that are truly nearby reduces the potential for false-positive recognition of synchronous user operations (due to pure chance synchronization of incidental operations on a large number of devices) and also may help to reduce power consumption requirements (by reducing wasted computation and transmission of messages seeking to establish synchronization with non-proximal devices).

The present invention solves these problems by providing a list of nearby devices for every device that seeks associations with other devices. For the stitching technique, devices (referred to as "stitchable devices") include stitching system software that only looks for correlating pen strokes within sets of devices that have been identified as being within short range proximity of one another. Stitchable devices update their signal strengths using the present invention fairly regularly (e.g., every twenty seconds) so that the set of stitchable devices at any one time is dynamic and discoverable by any new client wishing to make itself eligible for stitching. While this application considers associations for any device within short range proximity, it can be modified to consider only those devices within some physical range based on the distance estimation. Even as implemented, the present invention reduces the list of potentially associable devices from the whole world to just those within the range of one access point.

As can be readily appreciated, the present invention may be implemented in a peer-to-peer fashion, rather than one dependent on a central database. For short range proximity, peers can exchange Wi-Fi signatures and then have the clients perform the function for estimating separation distance. Another platform that would work are cell phones equipped with Wi-Fi cards; in one approach the phones would use their Wi-Fi card to create Wi-Fi signatures and then use their carrier's network to access the proximity server. Other types of radio may be incorporated as location signatures, such as Bluetooth and commercial broadcasts of radio and TV.

As can be seen from the foregoing detailed description, there is provided a method and system for detecting network devices or other resources that are proximate other network devices. Signal strengths (or other sensed conditions) are used in order to take advantage of existing infrastructure and hardware to provide network devices with the information needed to present meaningful proximity data to users of those devices. By providing lists of nearby people and places without computing their absolute locations, deployment is easier than with traditional location-based systems, and can still give absolute and relative distance estimates for short range proximity, and it can give travel time estimates for long range proximity. By growing the database as more people use the client, the richness and range of people and places that can be found in proximity increases. Further, the database helps protect the privacy of users by maintaining their data anonymously after a user-specified time period, and can protect itself against falsified access point signatures by verifying them against what it has already seen.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a proximity management computer system in a wireless network environment in which signal strengths data can be detected, a method for returning a sorted list of nearby resources of a specified type to a client, the method comprising:

receiving registration data from a user's client device in the wireless network environment, the registration data including registration data identifying the user's client device and identifying at least one non-networked resource, wherein the non-networked resource includes at least one of a room, a non-electronic device and an electronic device without wireless networking capabilities, the registration data for the non-networked resource being sent on behalf of the non-networked resource, the registration data being configured to include a client device wireless network environment signature for identifying the non-networked device's location in relation to the user's client device;

generating a globally unique identifier based on the user's registration data, such that transmissions from the user are associated with the user, regardless of which client device the user uses;

returning a globally unique identifier to the client device in response to receiving the registration data;

receiving a client device wireless network environment signature from and for the user, the client device wireless network environment signature including a data structure that associates the returned globally unique identifier with a MAC address and a corresponding determined received signal strength indicator for each base station the client device detected within the wireless network environment;

receiving a non-networked resource wireless network environment signature from the user, the non-networked resource wireless network environment signature including a data structure that associates the user's globally unique identifier with the corresponding determined received signal strength indicator for each base station the client device detected within the wireless network environment, such that the user's client device can report on the non-networked resource's behalf;

storing the client device wireless network environment signature and the non-networked resource wireless network environment signature in a database;

receiving a query from the user for a specified type of resource subsequent to storing the client device wireless network environment signature and the non-networked resource wireless network environment signature in the database;

accessing resource wireless network environment signatures and non-networked resource wireless network environment signatures for resources of the specified type from the database, each resource wireless network environment signature associating a globally unique identifier for a resource with a corresponding determined received signal strength indicator for each detected base station associated with the resource;

determining the similarity of each accessed resource wireless network environment signature to both the client device wireless network environment signature and the non-networked resource wireless network environment signature;

generating a list of resources of the specified type of resource in response to the received query, the list of resources sorted by physical distance from the client device, wherein resources having wireless network environment signatures with increased similarity to at least one of the client device wireless network environment signature and the non-networking resource wireless network environment signature are indicated as physically closer to the client device and wherein resources having a wireless network environment signature with reduced similarity to at least one of the client device wireless network environment signature and the non-networking resource wireless network environment signature are indicated as physically further from the client device; and returning the generated list of resources to the client device to indicate resources of the specified type that are available for use by the client device.

2. The method of claim 1 further comprising, building a database of signal strength data.

3. The method of claim 2 further comprising, determining from the database which base stations can be detected simultaneously with one another.

4. The method of claim 3 further comprising, maintaining a data structure that contains information as to which base stations are adjacent to which other base stations.

5. The method of claim 4 further comprising, providing data to the client device corresponding to how many base stations away the client device is to a resource.

6. The method of claim 2 wherein building the database includes discarding inconsistent information as to at least one base station that has not been previously detected.

7. The method of claim 2 wherein building the database includes discarding inconsistent information as to base stations that are reported as having overlapping coverage but have not been previously detected as having overlapping coverage.

8. The method of claim 1 wherein determining the similarity of each accessed resource wireless network environment signature to the client device wireless network environment signature comprises comparing how many base stations the client device has in common-with each resource.

9. The method of claim 1 wherein determining the similarity of each accessed resource wireless network environment signature to the client device wireless network comprises for each resource ordering base stations seen in common by signal strength values into a first ordering for the client device and a second ordering for the resource, and determining similarity between the first ordering and the second ordering.

10. The method of claim 1 further comprising, selecting numeric features for computing distance, and testing combinations of those features to determine a function that gives the best results with respect to actual distances.

11. The method of claim 1 wherein at least one resource is not connected to the network, and further comprising, using another network device to determine signal strength indicators for the at least one resource.

12. The method of claim 1 wherein the resource comprises a mobile computing device, and further comprising, obtaining a plurality of readings from the resource and returning information corresponding to the approximate distance to the resource based on a latest reading of the plurality.

13. The method of claim 1 wherein the generated list of resources includes short range proximity data for the client device, the short range proximity data corresponding to at least one resource that the client device can communicate with without the communication having to hop between access points.

14. The method of claim 13 further comprising using the short range proximity data to establish that a mobile device is closely associated with another mobile device.

15. The method of claim 13 wherein the short range proximity data is used to present a list of nearby people and things to a user of the client device.

16. The method of claim 1, further comprising tagging a wireless resource with a user-defined tag that includes the wireless resource's wireless signature.

17. The method of claim 16, wherein the tag further includes the user's GUID.

18. The method of claim 1, further comprising notifying the user when a resource of the specified type is found.

19. The method of claim 1, further comprising:
receiving subsequent registration data from a different client device used by the user; and
assigning the same globally unique identifier to the different client device based on the received subsequent registration data from the user.

20. The method of claim 1, wherein the proximity management computer system generates two lists of resources of the specified type of resource in response to the received query: a short range proximity list showing those resources of the desired type that have at least one detectable access point in common with the querying client and a long range proximity list showing those resources of the desired type that are reachable by hopping through access points with overlapping coverage.

21. The method of claim 20, wherein the resources found within hopping distance are reported with an estimate indicating the amount of time it would take to travel to the resource.

22. The method of claim 20, wherein determining the similarity of each accessed resource wireless network environment signature comprises determining the physical distance between at least one of the accessed resource and the client device and the accessed resource and the non-networked resource.

23. The method of claim 22, further comprising determining the physical distance by determining at least one of the following: the number of access points in common between the resources, the Spearman rank-order correlation coefficient which represents how closely the two resources ranked their common access points by signal strength, the sum of squared differences of signal strengths, and the number of access points unaccounted for in each list.

24. At a computer system operating in a wireless network environment, a method for the computer system to obtain a list of nearby resources of a specified resource type, the method comprising:
transmitting registration data to register a user's client device with a proximity management computer system, the registration data including registration data identifying the user's client device and identifying at least one non-networked resource, wherein the non-networked resource includes at least one of a room, a non-electronic device and an electronic device without wireless networking capabilities, the registration data for the non-networked resource being sent on behalf of the non-networked resource, the registration data being configured to include a client device wireless network environment signature for identifying the non-networked device's location in relation to the user's client device;
receiving a generated globally unique identifier from the proximity management computer system in response to registering with the proximity management computer system, the globally unique identifier being generated based on the user's registration data, such that transmissions from the user are associated with the user, regardless of which client device the user uses;
detecting one or more base stations within the wireless network environment;
for each detected base station included in the one or more base stations:
obtaining a MAC address for the detected base station;
determining a corresponding signal strength indicator for signals received from the detected base station;
creating a wireless network environment signature for the client device from the obtained MAC addresses and corresponding determined signal strength indicators of the detected base stations, the wireless network environment signature including a data structure that associates the generated globally unique identifier with each obtained MAC address and corresponding determined signal strength indicator;
transmitting a non-networked resource wireless network environment signature from the user, the non-networked resource wireless network environment signature including a data structure that associates the user's globally unique identifier with the corresponding determined received signal strength indicator for each base station the client device detected within the wireless network environment, such that the user's client device can report on the non-networked resource's behalf;
reporting the wireless network environment signature and the non-networked resource wireless network environment signature to the proximity management computer system;
submitting a query from the user for a specified type of resource to the proximity management computer system subsequent to reporting the wireless network environment signature; and
receiving a list of resources of the specified type of resource in response to the submitted query, the list of resources sorted by physical distance from the client device, wherein resources having wireless network environment signatures with increased similarity to at least one of the client device wireless network environment signature and the non-networking resource wireless network environment signature are indicated as physically closer to the client device and wherein resources having a wireless network environment signature with reduced similarity to at least one of the client device wireless network environment signature and the non-networking resource wireless network environment signature are indicated as physically further from the client device.

25. A computer system for implementing a method for returning a sorted list of nearby resources of a specified type to a client, the computer system comprising one or more computer-readable storage media having thereon computer-executable instructions that, when executed by one or more processors of the computing system, cause the computing system to perform the method, the method comprising:

receiving registration data from a user's client device in the wireless network environment, the registration data including registration data identifying the user's client device and identifying at least one non-networked resource, wherein the non-networked resource includes at least one of a room, a non-electronic device and an electronic device without wireless networking capabilities, the registration data for the non-networked resource being sent on behalf of the non-networked resource, the registration data being configured to include a client device wireless network environment signature for identifying the non-networked device's location in relation to the user's client device;

generating a globally unique identifier based on the user's registration data, such that transmissions from the user are associated with the user, regardless of which client device the user uses;

returning a globally unique identifier to the client device in response to receiving the registration data;

receiving a client device wireless network environment signature from and for the user, the client device wireless network environment signature including a data structure that associates the returned globally unique identifier with a MAC address and a corresponding determined received signal strength indicator for each base station the client device detected within the wireless network environment;

receiving a non-networked resource wireless network environment signature from the user, the non-networked resource wireless network environment signature including a data structure that associates the user's globally unique identifier with the corresponding determined received signal strength indicator for each base station the client device detected within the wireless network environment, such that the user's client device can report on the non-networked resource's behalf;

storing the client device wireless network environment signature and the non-networked resource wireless network environment signature in a database;

receiving a query from the user for a specified type of resource subsequent to storing the client device wireless network environment signature and the non-networked resource wireless network environment signature in the database;

accessing resource wireless network environment signatures and non-networked resource wireless network environment signatures for resources of the specified type from the database, each resource wireless network environment signature associating a globally unique identifier for a resource with a corresponding determined received signal strength indicator for each detected base station associated with the resource;

determining the similarity of each accessed resource wireless network environment signature to both the client device wireless network environment signature and the non-networked resource wireless network environment signature;

generating a list of resources of the specified type of resource in response to the received query, the list of resources sorted by physical distance from the client device, wherein resources having wireless network environment signatures with increased similarity to at least one of the client device wireless network environment signature and the non-networking resource wireless network environment signature are indicated as physically closer to the client device and wherein resources having a wireless network environment signature with reduced similarity to at least one of the client device wireless network environment signature and the non-networking resource wireless network environment signature are indicated as physically further from the client device; and returning the generated list of resources to the client device to indicate resources of the specified type that are available for use by the client device.

* * * * *